United States Patent
Imamura et al.

(10) Patent No.: US 10,737,682 B2
(45) Date of Patent: Aug. 11, 2020

(54) DRIVE FORCE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Yasuhiro Oshiumi, Gotemba (JP); Kazuma Aoki, Sunto-gun (JP); Yukari Okamura, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 72 days.

(21) Appl. No.: 16/116,343

(22) Filed: Aug. 29, 2018

(65) Prior Publication Data
US 2019/0071066 A1 Mar. 7, 2019

(30) Foreign Application Priority Data
Sep. 4, 2017 (JP) ................. 2017-169821

(51) Int. Cl.
| | |
|---|---|
| *B60W 20/40* | (2016.01) |
| *B60W 10/06* | (2006.01) |
| *B60W 10/10* | (2012.01) |
| *B60W 20/10* | (2016.01) |
| *B60K 6/44* | (2007.10) |
| *B60W 10/08* | (2006.01) |
| *B60W 30/184* | (2012.01) |

(Continued)

(52) U.S. Cl.
CPC .............. *B60W 20/10* (2013.01); *B60K 6/44* (2013.01); *B60W 10/06* (2013.01); *B60W 10/08* (2013.01); *B60W 10/10* (2013.01); *B60W 20/40* (2013.01); *B60W 30/184* (2013.01); *B60W 30/188* (2013.01); *B60K 2006/268* (2013.01); *B60W 2510/083* (2013.01); *B60W 2510/088* (2013.01); *B60W 2520/30* (2013.01); *B60W 2710/083* (2013.01); *B60W 2710/1005* (2013.01); *B60Y 2200/92* (2013.01)

(58) Field of Classification Search
CPC .... B60W 20/10; B60W 30/184; B60W 20/40; B60W 10/10; B60W 10/06; B60K 6/44
See application file for complete search history.

(56) References Cited

U.S. PATENT DOCUMENTS 9,731,706 B2* 8/2017 Nefcy .................. B60W 20/13
2002/0023791 A1 2/2002 Kima et al.
(Continued)

FOREIGN PATENT DOCUMENTS

| | | |
|---|---|---|
| JP | 2002-147596 A | 5/2002 |
| JP | 2017-007437 A | 1/2017 |
| WO | 2012/053633 A1 | 4/2012 |

*Primary Examiner* — Sherry L Estremsky
(74) *Attorney, Agent, or Firm* — Sughrue Mion, PLLC

(57) ABSTRACT

A drive force control system for hybrid vehicles configured to reduce a change in a drive force simultaneous execution of a starting operation of an engine and a shifting operation of a transmission. The drive force control is applied to a hybrid vehicle comprising: an engine connected to front wheels; a first motor connected to rear wheels; and a transmission that changes a speed ratio between the first motor and the rear wheels. A controller restricts execution of any one of an engine staring operation and a shifting operation of the transmission during execution of other one of the engine staring operation and shifting operation of the transmission.

12 Claims, 15 Drawing Sheets

(51) Int. Cl.
*B60W 30/188* (2012.01)
*B60K 6/26* (2007.10)

(56) References Cited

U.S. PATENT DOCUMENTS

2011/0219772 A1\* 9/2011 Steuernagel ............ B60K 6/48
 60/698
2013/0231815 A1 9/2013 Tanishima et al.
2016/0368361 A1 12/2016 Endo et al.

\* cited by examiner

Fig. 4

| Operating Mode | | CL1 | CL2 | B1 | MG1 | MG2 | ENG |
|---|---|---|---|---|---|---|---|
| HV Mode | HV-Lo Mode | ● | – | – | G | M | ON |
| | HV-Hi Mode | – | ● | – | G | M | ON |
| | Fixed Mode | ● | ● | – | | | ON |
| EV Mode | Dual-Motor Mode EV-Lo Mode | ● | – | ● | M | M | OFF |
| | Dual-Motor Mode EV-Hi Mode | – | ● | ● | M | M | OFF |
| | Single-Motor Mode | – | – | – | | M | OFF |

US 10,737,682 B2

DRIVE FORCE CONTROL SYSTEM FOR HYBRID VEHICLE

CROSS REFERENCE TO RELATED APPLICATIONS

The present disclosure claims the benefit of Japanese Patent Application No. 2017-169821 filed on Sep. 4, 2017 with the Japanese Patent Office, the disclosure of which are incorporated herein by reference in its entirety.

BACKGROUND

Field of the Invention

Embodiments of the present disclosure relate to the art of a drive force control system for a hybrid vehicle in which an output power of an engine is delivered to any one of a pair of front wheels and a pair of rear wheels, and in which an output power of a motor is delivered to the other one of the pair of front wheels and the pair of rear wheels.

Discussion of the Related Art

JP-A-2017-007437 describes a drive unit for a hybrid vehicle having a power distribution device in which a first rotary element is connected to an engine a second rotary element connected to a first motor, and a third rotary member is connected to an output member. The output member is connected to a second motor. According to the teachings of JP-A-2017-007437, an output torque of the second motor is delivered to the pair of wheels other than the pair of wheels to which an output torque of the first motor is delivered.

JP-A-2002-147596 describes a control device for in-wheel transmissions in an electric vehicle. According to the teachings of JP-A-2002-147596, each of the motors is individually connected to a stepped transmission in which a gear ratio is selected from high gear ratio to deliver an output torque of the motor to the wheel without multiplying, and a low-gear ratio to deliver the output torque of the motor to the wheel while multiplying. The control device is configured to perform a gear-change of the transmissions with a time difference at each wheel, whereby reducing shocks as might be generated by executing the gear-change of all of the transmissions simultaneously. In the electric vehicle of this kind, during execution of a gear-change of any of the transmissions, a torque transmission through the transmission performing the gear-change is substantially interrupted. Consequently, drive forces of the right wheel and the left wheel are differentiated to generate a yaw moment undesirably. In order to avoid such disadvantage, the control device taught by JP-A-2002-147596 is configured to increase the drive force of the other wheel on the same side.

WO 2012/053633 describes a control device for a hybrid vehicle comprising an engine, a motor connected to an output shaft of the engine through a first clutch, and an automatic transmission connected an output shaft of the motor. The control device taught by WO 2012/053633 is configured to start the engine by the motor while engaging the first clutch. In order to reduce shocks as might be generated by executing a shifting operation of the transmission and a cranking of the engine simultaneously, the control device taught by WO 2012/053633 is further configured to predict that the shifting operation of the transmission and the cranking of the engine are executed simultaneously. According to the teachings of WO 2012/053633, in a case that the shifting operation of the transmission and the cranking of the engine are expected to be executed simultaneously, the shifting operation of the transmission is executed first, and thereafter the cranking of the engine is executed.

In the hybrid vehicle taught by JP-A-2017-007437, during propulsion in an Electric Vehicle mode in which the hybrid vehicle is powered by the first motor and the second motor, the engine may be started by the output torque of the first motor thereby shifting an operating mode to a Hybrid Vehicle mode in which the hybrid vehicle is powered at least by the engine. In this situation, however, the first motor may not serve as a prime mover, and a reaction torque resulting from the cranking of the engine is applied to drive wheels. Consequently, drive force to propel the hybrid vehicle may be reduced temporarily. In addition, the output torque of the engine is changed significantly during a period from an initial combustion to a complete combustion, and the drive force is also changed by such change in the output torque of the engine. Further, vibrations generated during the period from the initial combustion to the complete combustion may propagate to a vehicle body to generate noises.

In the vehicle in which the output torque of the second motor is delivered to the wheel other than the wheel to which the output torque of the first motor is delivered, a transmission has to be arranged between the second motor and the wheel to which the output torque of the second motor is delivered for the purpose of changing an operating point of the second motor and increasing the drive force. In the vehicle of this kind, a speed of the second motor is changed by changing a speed ratio of the transmission, therefore, an inertia torque may be delivered to the wheel to which the output torque of the second motor is delivered according to a change in the speed of the second motor. In addition, when changing a speed ratio of the transmission, the torque delivered from the second motor to the wheel may be reduced temporarily.

Thus, cranking of the engine and shifting operation of the transmission are executed simultaneously in the vehicle in which a torque is delivered to one of the wheels and another one of the wheels separately from different prime movers, the drive force of the vehicle may be changed significantly by changes in the drive forces of one of the wheels and another one of the wheels.

SUMMARY

Aspects of embodiments of the present disclosure have been conceived noting the foregoing technical problems, and it is therefore an object of the present disclosure is to provide a drive force control system for hybrid vehicles that is configured to reduce a change in a drive force of the vehicle resulting from execution of a starting operation of an engine and a shifting operation of a transmission.

The drive force control system according to the embodiment of the present disclosure is applied to a hybrid vehicle comprising: an engine that is connected to any one of pairs of front wheels and rear wheels in a torque transmittable manner; a first rotary machine that is connected to other one of the pairs of the front wheels and the rear wheels in a torque transmittable manner; and a transmission that changes a speed ratio between the first rotary machine and said other one of the pairs of the front wheels and the rear wheels. The drive force control system is provided with a controller that controls the engine and the transmission. The controller is configured to restrict execution of any one of an engine staring operation and a shifting operation of a speed ratio of the transmission during execution of other one of the engine staring operation and the shifting operation of the transmission.

In a non-limiting embodiment, the controller may be further configured to delay execution of any one of the engine staring operation and the shifting operation of the transmission when a condition to execute the engine staring operation and a condition to execute the shifting operation of the transmission are satisfied.

In a non-limiting embodiment, the controller may be further configured to delay execution of the shifting operation of the transmission with respect to the engine starting operation.

In a non-limiting embodiment, an output torque of the first rotary machine may be determined in accordance with a required drive force of the vehicle. In addition, the controller may be further configured to: calculate a change in a torque delivered to said one of the pairs of the wheels during execution of the engine starting operation; increase the output torque of the first rotary machine in a case that the torque delivered to said one of the pairs of the wheels during execution of the engine starting operation is reduced; and reduce the output torque of the first rotary machine in a case that the torque delivered to said one of the pairs of the wheels during execution of the engine starting operation is increased.

In a non-limiting embodiment, the controller may be further configured to start the engine starting operation after reducing the output torque of the first rotary machine when the condition to execute the engine starting operation is satisfied.

In a non-limiting embodiment, the controller may be further configured to start the shifting operation of the transmission after reducing the output torque of the first rotary machine when the condition to execute the shifting operation of the transmission is satisfied.

In a non-limiting embodiment, the controller may be further configured to calculate a required drive force of the vehicle, and not to restrict said other one of the engine starting operation and the shifting operation of the transmission in a case that the calculated required drive force is greater than a predetermined value.

In a non-limiting embodiment, the controller may be further configured not to restrict said other one of the engine starting operation and the shifting operation of the transmission in a case that a condition to execute said other one of the engine starting operation and the shifting operation of the transmission is satisfied to protect a component of the vehicle including the engine, the first rotary machine, and the transmission.

In a non-limiting embodiment, the controller may be further configured to set a rate of shifting the speed ratio based on an inertia torque of the first rotary machine resulting from execution of the shifting operation of the transmission.

In a non-limiting embodiment, the hybrid vehicle may further comprise a second rotary machine that is connected to said one of the pairs of wheels. An output torque of the second rotary machine may be determined in accordance with a required drive force of the vehicle. In addition, the controller may be further configured to: calculate a change in a torque delivered to said one of the pairs of the wheels during execution of the engine starting operation; increase the output torque of the second rotary machine in a case that the torque delivered to said one of the pairs of the wheels during execution of the engine starting operation is reduced; and reduce the output torque of the second rotary machine in a case that the torque delivered to said one of the pairs of the wheels during execution of the engine starting operation is increased.

In a non-limiting embodiment, the controller may be further configured to start the engine starting operation after reducing the output torque of the second rotary machine when the condition to execute the engine starting operation is satisfied.

In a non-limiting embodiment, the hybrid vehicle may further comprise: a third rotary machine that translates an output power of the engine partially into an electric power; and a power split mechanism that distributes the output power of the engine to the third rotary machine and to an output member. The power split mechanism may establish a first mode in which the output power of the engine is distributed to the third rotary machine and to an output member at a first predetermined ratio, and a second mode in which the output power of the engine is distributed to the third rotary machine and to an output member at a second predetermine ratio where a ratio of the power distributed to the output member is smaller than that of the first predetermine ratio. In addition, the controller is further configured to crank the engine by an output torque of the third rotary machine.

Thus, according to the embodiment of the present disclosure, execution of any one of the engine staring operation and the shifting operation of the transmission is restricted during execution of other one of the engine staring operation and shifting operation of the transmission. Specifically, one of the engine staring operation and the shifting operation of the transmission is delayed until the completion of the other one of the operations, even if the condition to execute said one of the operations is satisfied during execution of the other one of the operations. According to the embodiment of the present disclosure, therefore, the engine staring operation and the shifting operation of the transmission will not be executed simultaneously. For this reason, the drive force for propelling the vehicle will not be changed significantly by a simultaneous execution of the engine starting operation and the shifting operation of the transmission.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 4 is a table showing engagement states of engagement devices and operating conditions of the prime movers in each operating mode;

DETAILED DESCRIPTION OF THE PREFERRED EMBODIMENT(S)

Figure 1:
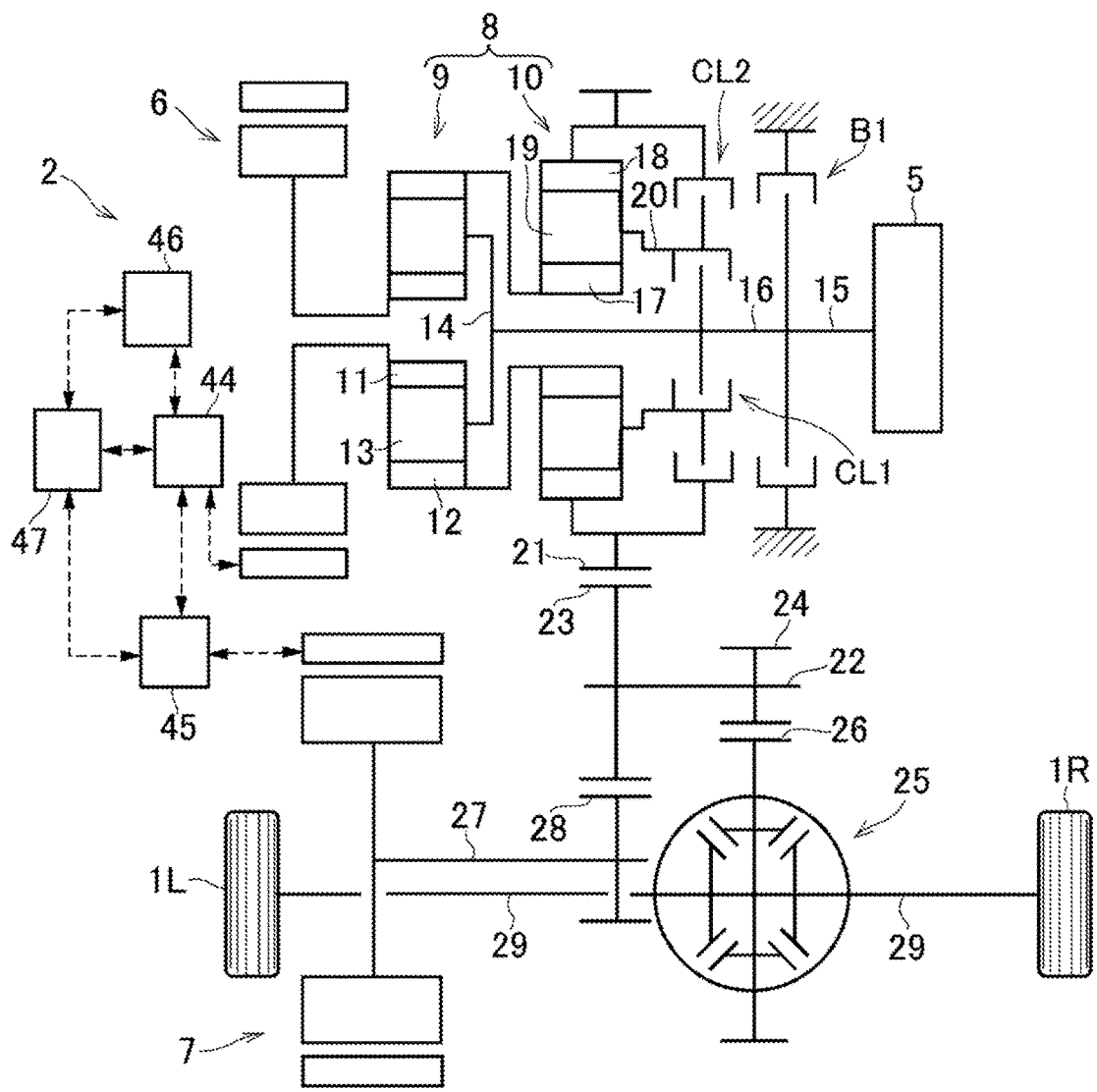
FIG. 1 is a skeleton diagram showing a first drive unit according to at least one embodiment of the present disclosure.
Figure 2:
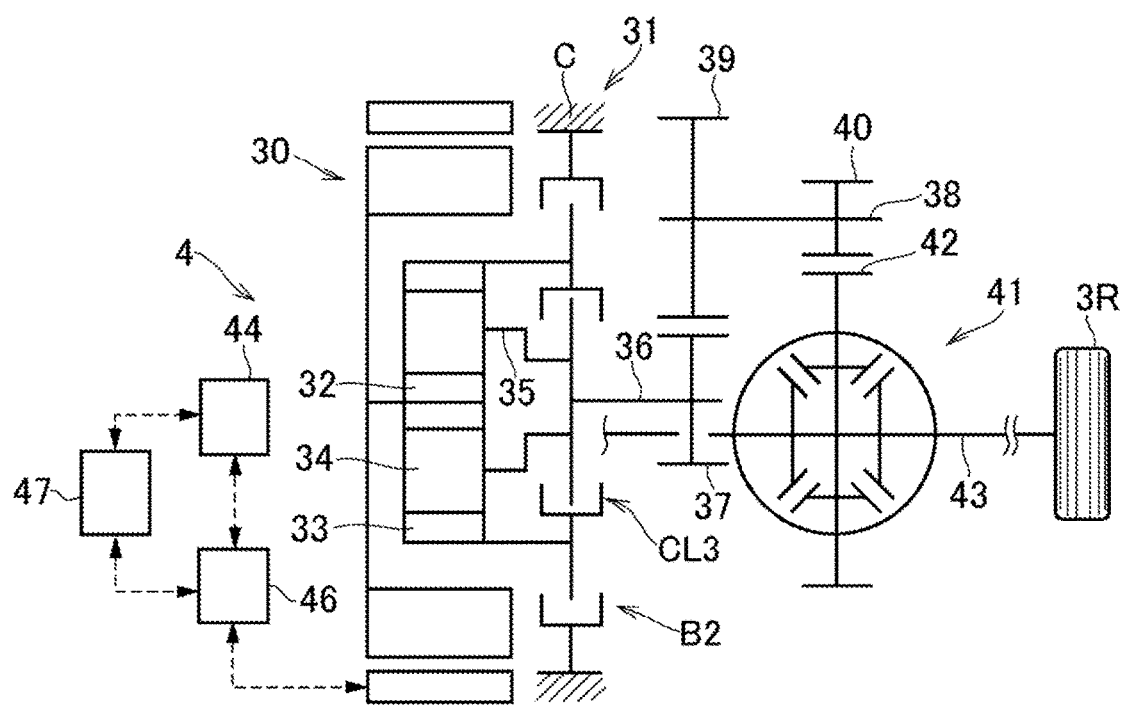
FIG. 2 is a skeleton diagram showing a second drive unit according to at least one embodiment of the present disclosure.

Preferred embodiments of the present disclosure will now be explained with reference to the accompanying drawings. Referring now to FIGS. 1 and 2, there are shown the embodiment of the hybrid vehicle according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The hybrid vehicle is provided with an engine 5, a first motor 6 (abbreviated as "MG1" in the drawings) and a second motor 7 (abbreviated as "MG2" in the drawings). Specifically, the first motor 6 is a motor-generator having a generating function. In the hybrid vehicle according to the embodiment, a speed of the engine 5 is controlled by the first motor 6, and the second motor 7 is driven by electric power generated by the first motor 6 to generate a drive force for propelling the vehicle. Optionally, the motor-generator having a generating function may also be used as the second motor 7. In the hybrid vehicle, accordingly, the first motor 6 serves as a third rotary machine, and the second motor 7 serves as a second rotary machine.

A power split mechanism 8 as a transmission is connected to the engine 5. The power split mechanism 8 includes a power split section 9 that distributes an engine torque to the first motor 6 side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 with the carrier 14 of the power split section 9. To this end, for example, a wet-type multiple plate clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the hybrid vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied. Accordingly, the rear motor 30 serves as a first rotary machine of the embodiment.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a casing C holding the second drive unit 4 so that the ring gear 33 is allowed to serve as a reaction element. To this end, the second brake B2 may be adapted to stop the rotation of the ring gear 33 not only completely but also incompletely. In the embodiment, the frictional engagement device is used as the third clutch CL3 and the second brake B2 respectively.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction unit. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47.

Figure 3:
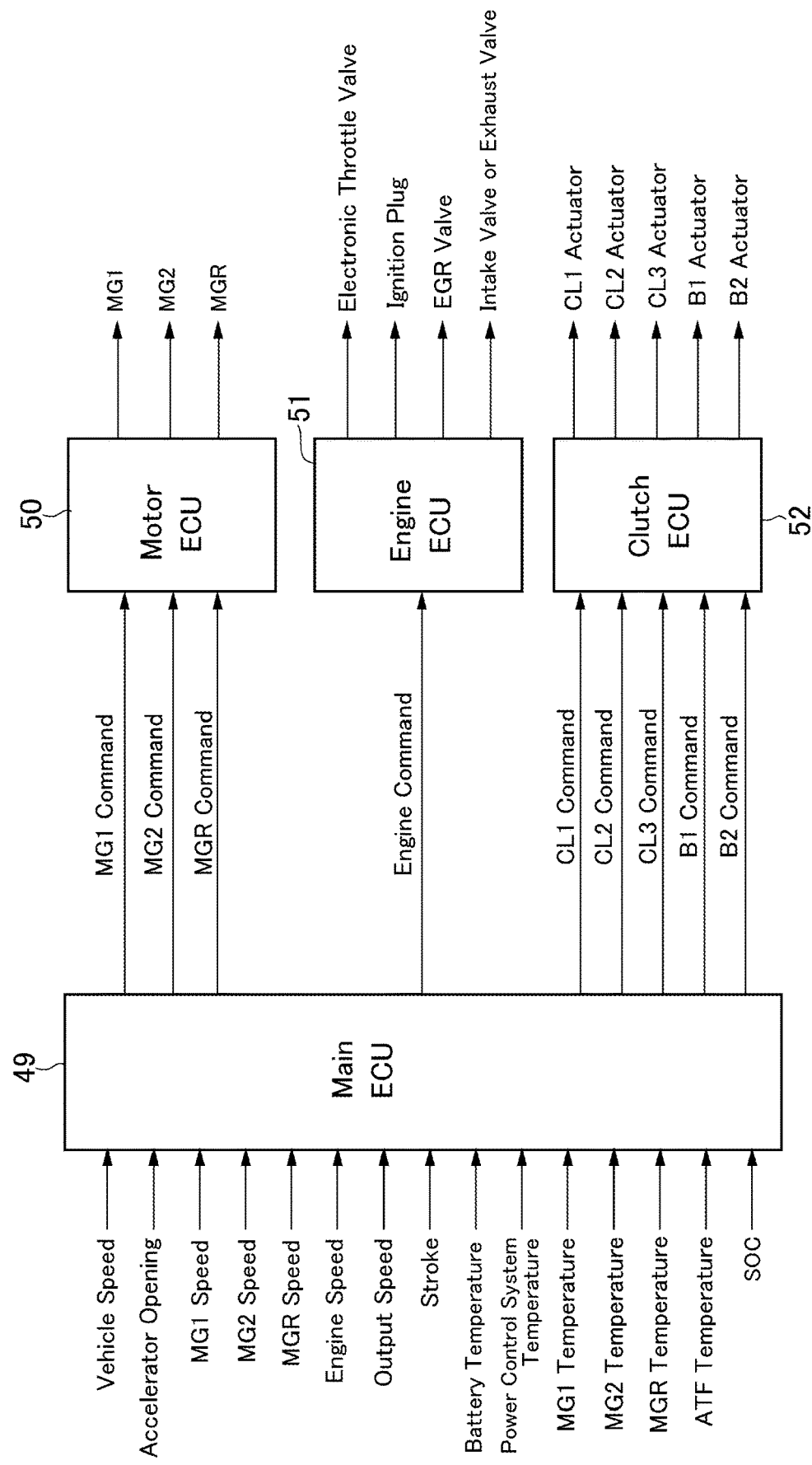
FIG. 3 is a block diagram showing a structure of an electronic control unit.

In order to control the first power control system 44, the second power control system 45, the third power control system 46, the engine 5, the clutches CL1, CL2, CL3, and the brakes B1,B2, the hybrid vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50 (abbreviated as "MG-ECU" in the drawings), an engine ECU 51, and a clutch ECU 52.

The main ECU 49 is configured to execute a calculation based on incident data from sensors as well as maps and formulas installed in advance, and transmits a calculation result to the motor ECU 50, the engine ECU 51, and the clutch ECU 52 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the ECUs 44, 45, and 46; a temperature of the first motor 6; a temperature of the second motor 7; a temperature of the rear motor 30; a temperature of oil (i.e., ATF) lubricating the power split mechanism 8 and the transmission 31; and a state of charge (to be abbreviated as the "SOC" hereinafter) level of the battery 47.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the hybrid vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

In the hybrid vehicle according to the embodiment, an operating mode may be selected from a hybrid mode (to be abbreviated as the "HV mode" hereinafter) in which the hybrid vehicle is propelled by a drive torque generated by the engine 5, and an electric vehicle mode (to be abbreviated as the "EV mode" hereinafter) in which the hybrid vehicle is propelled by drive torques generated by at least one of the first motor 6 and the second motor 7 or by the rear motor 30 without using the engine 5. The HV mode may be selected from a hybrid-low mode (to be abbreviated as the "HV-Lo mode" hereinafter) as a first mode of the embodiment, a hybrid-high mode (to be abbreviated as the "HV-Hi mode" hereinafter) as a second mode of the embodiment, and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a first EV mode in which the second motor 7 and the rear motor 30 generate drive torques to propel the hybrid vehicle without generating a drive torque by the first motor 6, and a second EV mode in which the first motor 6 also generates a drive torque in addition to the second motor 7 and the rear motor 30. Further, the second EV mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor. In the first EV mode, the hybrid vehicle is powered only by the second motor 7, while engaging the first clutch CL1, while engaging the second clutch CL2, or while disengaging both of the first clutch CL1 and the second clutch CL2.

The rear motor 30 is driven simultaneously with the second motor 7 or instead of the second motor 7. Specifically, in the HV mode, it is possible to power the hybrid vehicle by the rear motor 30 without generating a torque by the second motor 7, and to power the hybrid vehicle by both of the second motor 7 and the rear motor 30. During operation of the rear motor 30, a gear stage of the transmission 31 may be changed e.g., to alter an operating point of the rear motor 30, and to multiply torque to be delivered to the rear wheels 3R and 3L. When the rear motor 30 does not generate a torque, it is possible to interrupt torque transmission between the rear motor 30 and the rear wheels 3R and 3L by disengaging the third clutch CL3 and the second brake B2, so as to reduce a power loss resulting from rotating the rear motor 30 passively.

FIG. 4 shows engagement states of the first clutch CL1, the second clutch CL2, and the first brake B1, and operating conditions of the first motor 6, the second motor 7, and the engine 5 in each operating mode. As described, the rear motor 30 is driven simultaneously with the second motor 7 or instead of the second motor 7. Therefore, the rear motor 30 is not indicated in FIG. 4 for the sake of illustration.

FIG. 4 "•" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque. During propulsion in the first EV mode, an output power of the engine 5 may be translated entirely into an electric energy by operating the first motor 6 as a generator. In this case, since the engine 5 does not function as a prime mover, the status of the engine 5 is indicated as "OFF" in FIG. 3.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque. As described, the rear motor 30 is driven simultaneously with the second motor 7 or instead of the second motor 7. Therefore, the rear motor 30 is not indicated also in FIGS. 5 to 10.

Figure 5:
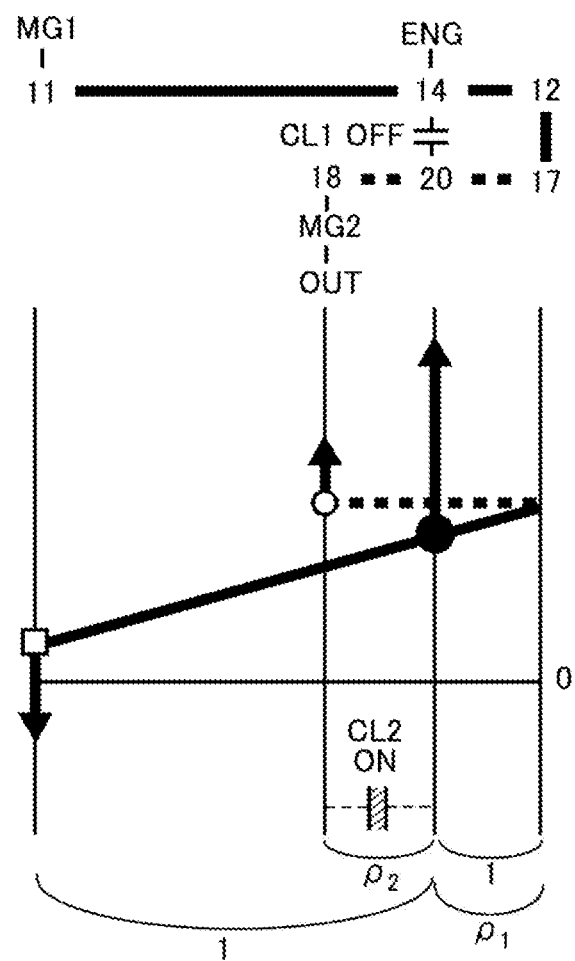
FIG. 5 is a nomographic diagram showing a situation in a HV-Hi mode.
Figure 6:
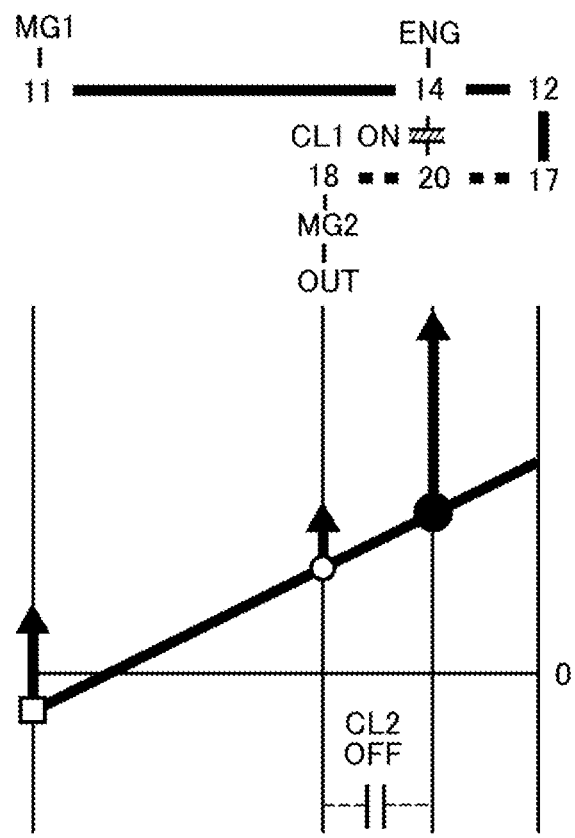
FIG. 6 is a nomographic diagram showing a situation in a HV-Lo mode.

As indicated in FIGS. 5 and 6, in the HV-Hi mode and the HV-Lo mode, any one of the first clutch CL1 and the second clutch CL2 is engaged, and the engine 5 generates a drive torque while establishing a reaction torque by the first motor 6. In this situation, a rotational speed of the first motor 6 is controlled in such a manner as to optimize a total energy efficiency in the first drive unit 2 including a fuel efficiency of the engine 5 and a driving efficiency of the first motor 6.

Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\rho 1 \cdot \rho 2)$", and a ratio of the torque applied to the ring gear 18 in the HV-Hi mode may be expressed as "$1/(\rho 1)$". In other words, given that the torque of the engine 5 is "1", a ratio of the torque of the engine 5 delivered to the ring gear 18 in the HV-Lo mode may be expressed as "$1/(1-(\rho 1-\rho 2))$", and a ratio of the torque of the engine 5 delivered to the ring gear 18 in the HV-Hi mode may be expressed as "$1/(\rho 1+1)$". In the above-expressed expressions, "$\rho 1$" is a gear ratio of the power split section 9 (i.e., a ratio between teeth number of the ring gear 12 and teeth number of the sun gear 11), and "$\rho 2$" is a gear ratio of the transmission section 10 (i.e., a ratio between teeth number of the ring gear 18 and teeth number of the sun gear 17). Specifically, "$\rho 1$" and "$\rho 2$" are individually smaller than "1". That is, in the HV-Lo mode, a ratio of the torque delivered to the ring gear 18 is increased in comparison with that in the HV-Hi mode. Accordingly, "$1/(1-(\rho 1-\rho 2))$" corresponds to a first predetermined ratio of the embodiment, and "$1/(\rho 1+1)$" corresponds to a second predetermined ratio of the embodiment. Further, the ring gear 18 and the driven gear 23 serve as an output member in the embodiment.

In the HV mode, the electric power generated by the first motor 6 is supplied to any one the second motor 7 and the rear motor 30, and in addition, the electric power accumulated in the battery 47 is also supplied to the second motor 7 and the rear motor 30 as necessary. In the hybrid vehicle, the second motor 7 and the rear motor 30 are used to assist the drive torque generated by the engine 5. That is, the rear motor 30 may also be controlled in a similar manner as the second motor 7.

Figure 7:
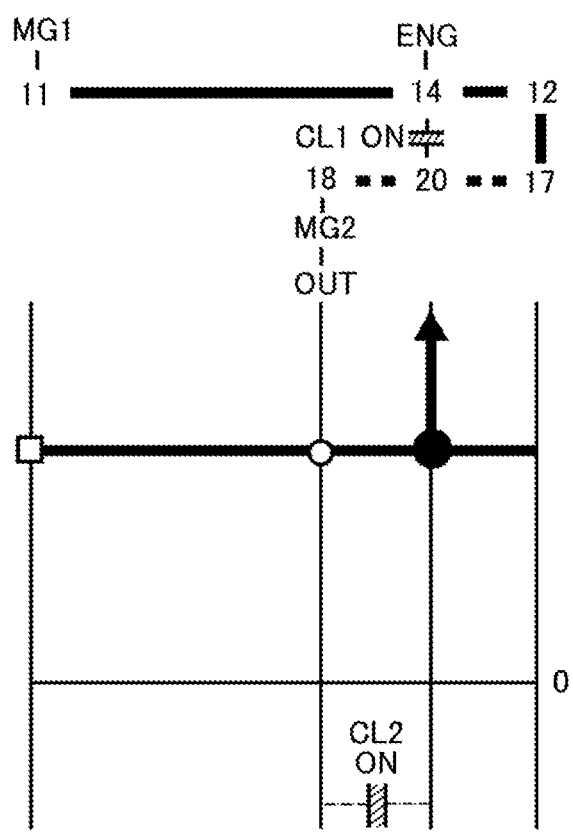
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. In other words, the output power of the engine 5 will not be translated into an electric energy by the first motor 6 and the second motor 7. For this reason, a power loss as might be caused by slippage of the gears 11, 12, 13, 17, 18, and 19, and a power loss associated with such energy conversion will not be caused in the fixed mode and hence power transmission efficiency can be improved.

Figure 8:
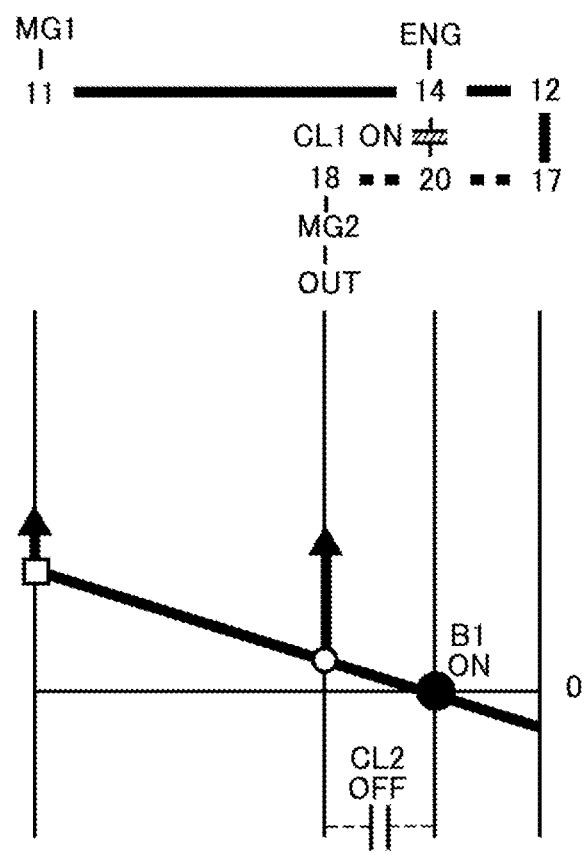
FIG. 8 is a nomographic diagram showing a situation in an EV-Lo mode.
Figure 9:
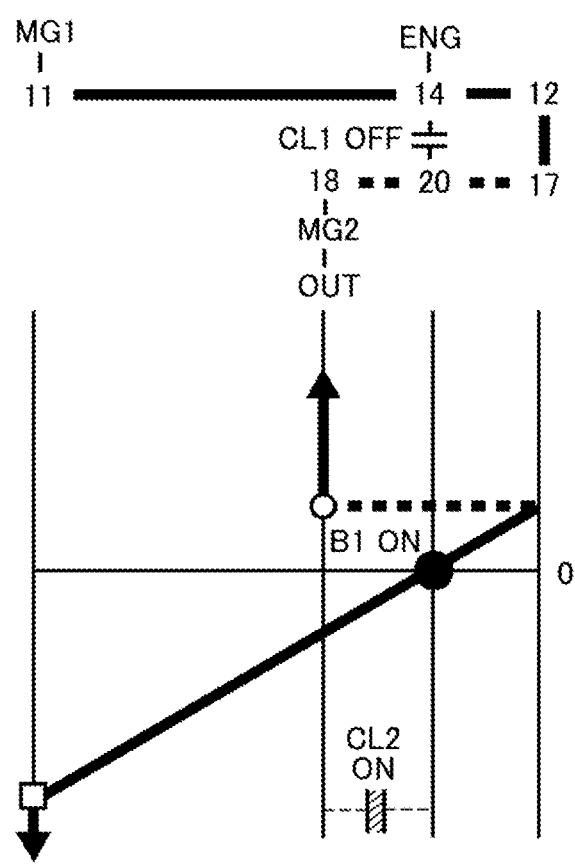
FIG. 9 is a nomographic diagram showing a situation in an EV-Hi mode.
Figure 10:
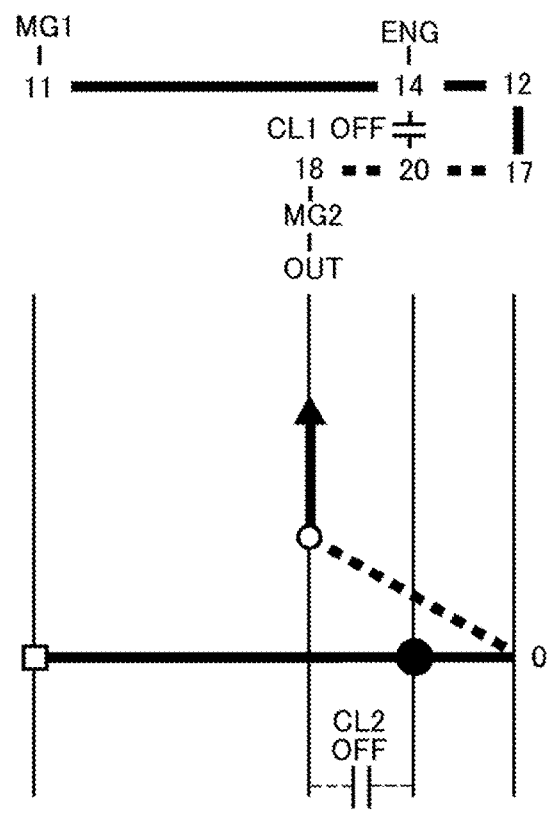
FIG. 10 is a nomographic diagram showing a situation in a first EV mode.

As indicated in FIGS. 8 and 9, in the EV-Lo mode and the EV-Hi mode, the first brake B1 is engaged, and the first motor 6 and the second motor 7 generates the drive torques to propel the hybrid vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the HV-Lo mode is greater than that in the HV-Hi mode so that a greater drive force is established in the EV-Lo mode. As indicated in FIG. 10, in the first EV mode, only the second motor 7 generates a drive torque, and both of the clutch CL1 and the second clutch CL2 are disengaged. In the first EV mode, therefore, all of the rotary elements on the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the hybrid vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
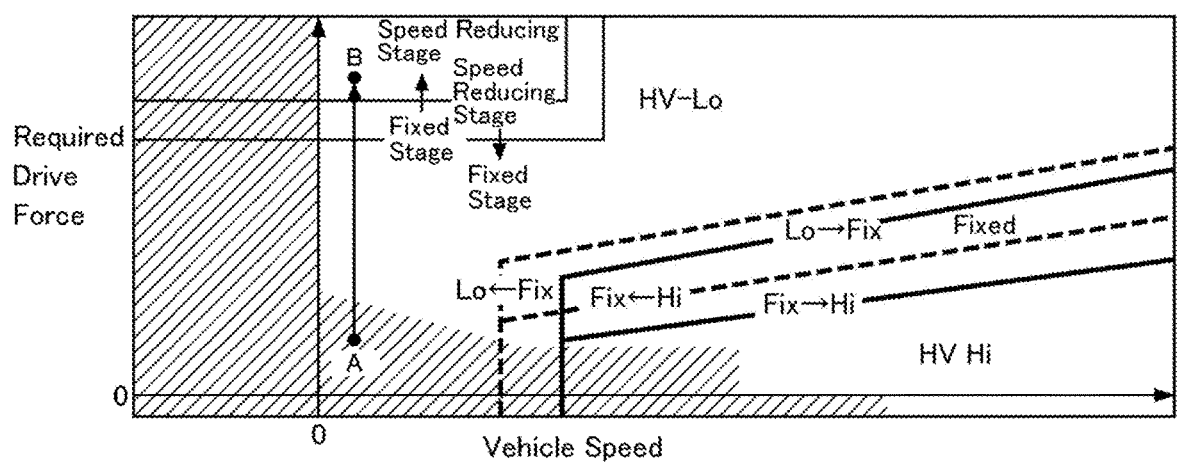
FIG. 11 shows a map for determining an operating mode during propulsion in a CD mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the first EV mode is selected. In the CS mode, the first EV mode is selected when the hybrid vehicle is propelled in a reverse direction irrespective of the required drive force, and when the hybrid vehicle is propelled in a forward direction and the required drive force is small (or when decelerating). Such area where the first EV mode is selected is determined based on specifications of the second motor 7 and the rear motor 30.

During forward propulsion in the CS mode, the HV mode is selected when the large drive force is required. In the HV mode, the drive force may be generated from a low speed range to a high speed range. When the SOC level falls close to a lower limit level, or when worming up a not shown purifying device connected to the engine 5, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lw←Fix" line from right to left, or when the operating point is shifted across the "Lw←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

In the case of generating a drive torque by the rear motor 30, the gear stage of the transmission 31 is shifted from the fixed stage to the speed reducing stage when the operating point is shifted across the "Fixed Stage→Speed Reducing Stage" line from right to left or when the operating point is shifted across the "Fixed Stage→Speed Reducing Stage" line upwardly from the bottom. In this case, the gear stage of the transmission 31 is shifted from the speed reducing stage to the fixed stage when the operating point is shifted across the "Speed Reducing Stage→Fixed Stage" line from left to right or when the operating point is shifted across the "Speed Reducing Stage→Fixed Stage" line downwardly from the top. If an operating efficiency of the rear motor 30 in the speed reducing stage is higher than that in the fixed stage, the speed reducing stage may be selected without reference to the map shown in FIG. 11. That is, the gear stage of the transmission 31 should not be selected based only on the required drive force and the vehicle speed.

Figure 12:
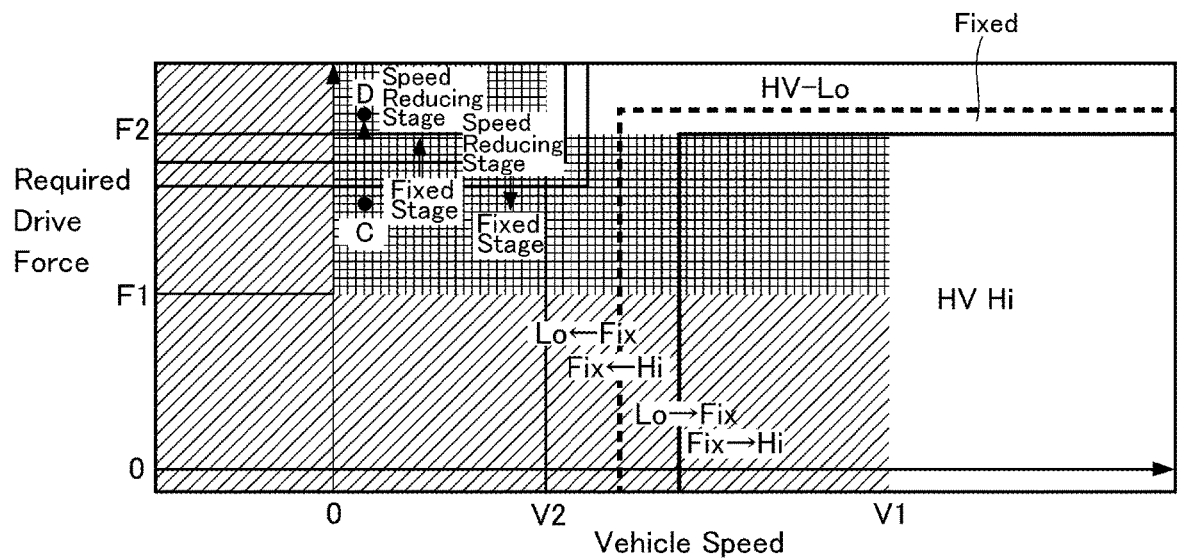
FIG. 12 shows a map for determining an operating mode during propulsion in a CS mode.

FIG. 12 shows an example of a map used to select the operating mode and the gear stage of the transmission 31 during propulsion in the CD mode. In FIG. 12, the vertical axis also represents the required drive force, and the horizontal axis also represents the vehicle speed.

In FIG. 12, the hatched area is also an area where the first EV mode is selected. In the CD mode, the first EV mode is selected when the hybrid vehicle is propelled in a reverse direction irrespective of the required drive force, and when the hybrid vehicle is propelled in a forward direction and the required drive force is smaller than a first threshold force value F1 (or when decelerating). Such area where the first EV mode is selected is also determined based on specifications of the second motor 7 and the rear motor 30.

During forward propulsion in the CD mode, the second EV mode is selected when the drive force greater than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level of the battery 47 falls close to the lower limit level, therefore, the HV mode may be selected even if the operating point falls within the areas where the first EV mode and the second EV mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lw←Fix" and "Lo→Fix" lines. Likewise, the operating mode is shifted between the HV-Hi mode and the fixed mode when the operating point is shifted across the "Fix←Hi" and "Fix→Hi" lines.

In the case of generating a drive torque by the rear motor 30, the gear stage of the transmission 31 is shifted from the fixed stage to the speed reducing stage when the operating point is shifted across the "Fixed Stage→Speed Reducing Stage" line from right to left or when the operating point is shifted across the "Fixed Stage→Speed Reducing Stage" line upwardly from the bottom. In this case, the gear stage of the transmission 31 is shifted from the speed reducing stage to the fixed stage when the operating point is shifted across the "Speed Reducing Stage→Fixed Stage" line from left to right or when the operating point is shifted across the "Speed Reducing Stage→Fixed Stage" line downwardly from the top. The "Fixed Stage→Speed Reducing Stage" line and the "Speed Reducing Stage→Fixed Stage" line shown in FIG. 12 are set to the same locations as the "Fixed Stage→Speed Reducing Stage" line and the "Speed Reducing Stage→Fixed Stage" line shown in FIG. 11. That is, the gear stage of the transmission 31 should not be selected based only on the required drive force and the vehicle speed.

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

Thus, the operating mode and the gear stage are selected based on the operating point governed by the required drive force and the vehicle speed in principle. For example, when the accelerator pedal is depressed so that the operating point is shifted from a point A to a point B shown in FIG. 11 in an extremely short period of time, a condition to shift the operating mode from the first EV mode to the HV-Lo mode and a condition to shift the gear stage of the transmission 31 from the fixed stage to the speed reducing stage are satisfied. In addition, the HV mode may be selected irrespective of the operating condition for the purpose of warming-up the engine 5. For example, when a selection of the HV mode is demanded while the operating point is shifted from a point C to a point D shown in FIG. 11 as a result of depression of the accelerator pedal, a condition to shift the operating mode from the second EV mode to the HV-Lo mode and a condition to shift the gear stage of the transmission 31 from the fixed stage to the speed reducing stage are satisfied. That is, a condition to start the engine 5 and a condition to execute a shifting operation of thee gear stage are satisfied simultaneously.

Here will be explained an example for controlling the engine 5 and the motors 6, 7, and 30 in a case of shifting the operating mode from the EV-Lo mode to the HV-Lo mode or from the EV-Hi mode to the HV-Hi mode without manipulating the clutch. When shifting from the EV mode to the HV mode without manipulating the clutch, the engine 5 is cranked by controlling a speed of the first motor 6 while maintaining an engagement of the clutch in engagement. Specifically, a target speed of the first motor 6 is set based on a predetermined target starting speed of the engine 5 and a gear ratio of the power split section 9, and speed and torque of the first motor 6 are controlled based on the target speed. During controlling the speed of the first motor 6 to the target speed, an output torque of the first motor 6 is also acts in a direction to reduce drive torques of the drive wheels (i.e., the front wheels 1R and 1L).

When the engine speed is increased to the target starting speed of the engine 5 an air/fuel mixture is supplied to the engine 5 and the engine 5 is ignited. Immediately after starting the engine 5 (i.e., during the initial combustion), pulsation of the output torque of the engine 5 is increased in comparison with the pulsation in a steady operation, and the pulsation of the output torque of the engine 5 is then reduced gradually. Such pulsation of the output torque of the engine 5 may also be delivered to the drive wheels (i.e., the front wheels 1R and 1L).

Next, here will be explained an example for controlling the engine 5 and the motors 6, 7, and 30 in a case of shifting the operating mode from the EV-Lo mode to the HV-Hi mode or from the EV-Hi mode to the HV-Lo mode while manipulating the clutches. In those cases, the engine 5 is started first of all without manipulating the clutch. Specifically, in the case of shifting from the EV-Lo mode to the HV-Hi mode, the operating mode is shifted from the EV-Lo mode to the HV-Hi mode while starting the engine 5. By contrast, in the case of shifting from the EV-Hi mode to the HV-Lo mode, the operating mode is shifted from the EV-Hi mode to the HV-Hi mode, and then the clutch is manipulated. Specifically, an input speed and an output speed of the clutch to be engaged are synchronized by controlling a speed of the first motor 6, and then the clutch to be engaged is engaged. That is, the fixed mode is established temporarily, and then the clutch to be disengaged is disengaged.

When shifting the operating mode from the first EV mode to the HV mode during propulsion while disengaging the first clutch CL1 and the second clutch CL2, first of all, an input speed and an output speed of any one of the first clutch CL1 and the second clutch CL2 are synchronized by controlling a speed of the first motor 6, and then said one of the first clutch CL1 and the second clutch CL2 is engaged. Thereafter, the engine 5 is cranked by the first motor 6.

In any of those situations, the drive force may be reduced as a result of the cranking of the engine 5, and vibrations may be generated immediately after starting the engine 5 by the increased pulsation of the engine torque.

Next, here will be explained a shifting control of the transmission 31. A shifting operation of the transmission 31 is executed by disengaging any one of the third clutch CL3 and the second brake B2 (e.g., the third clutch CL3) while engaging the other one of the third clutch CL3 and the second brake B2 (e.g., the second brake B2). The gear stage of the transmission 31 may be shifted by a so-called "clutch-to-clutch shifting" in which a torque transmitting capacity of the engagement device to be disengaged is reduced gradually and a torque transmitting capacity of the engagement device to be engaged is increased gradually. In the case of shifting the gear stage of the transmission 31 by the clutch-to-clutch shifting, the torques delivered to the rear wheels 3R and 3L are reduced by a reduction in the torque in an inertia phase.

Given that a dog clutch is used as the third clutch CL3 and the second brake B2 respectively, for example, the third clutch CL3 is disengaged completely first of all. Then, an input speed and an output speed of the second brake B2 are synchronized by controlling a speed of the first motor 6, and the second brake B2 is engaged. That is, if the dog clutches are used as the third clutch CL3 and the second brake B2, torque transmission between the rear motor 30 and the rear wheels 3R and 3L is interrupted temporarily. For this reason, the drive torque drops temporarily.

That is, if the engine starting control and the shifting operation of the gear stage are executed simultaneously, the drive force may be changed significantly. In order to avoid such disadvantage, according to the embodiment of the present disclosure, the drive force control system is configured to restrict one of those controls during execution of the other one of the controls. Specifically, the drive force control system is configured to start the shifting operation of the gear stage after the completion of the engine starting control, or to start the engine starting control after the completion of the shifting operation of the gear stage. In other words, the drive force control system is configured to prevent simultaneous execution of the engine starting control and the shifting operation of the gear stage.

Figure 13:
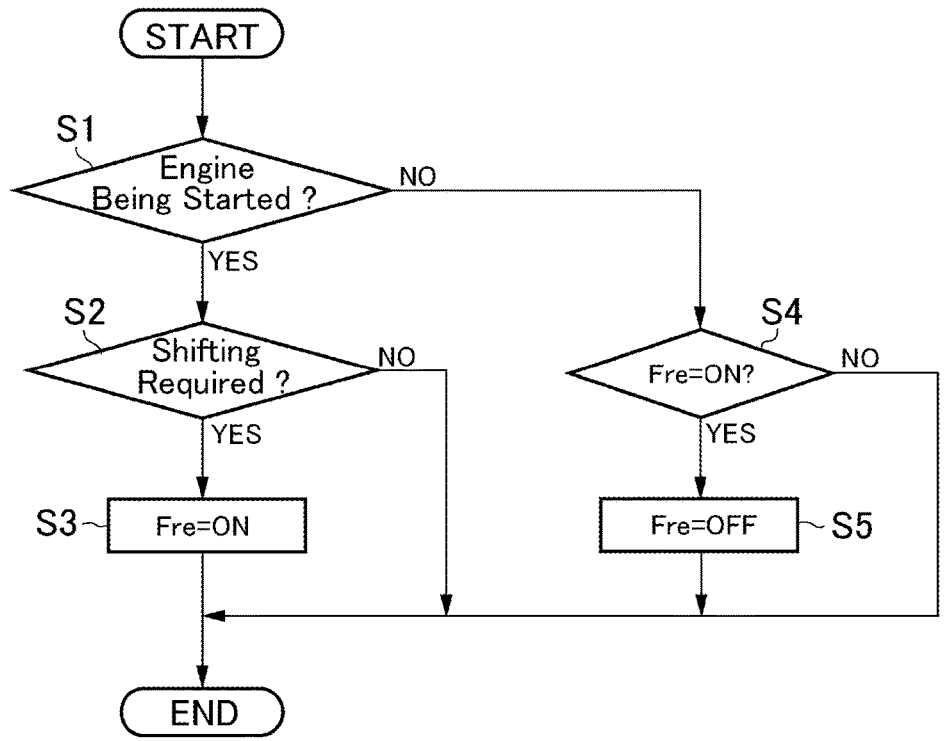
FIG. 13 is a flowchart showing one example of a routine to delay a shifting operation when a shifting of a gear stage is required during starting the engine.

FIG. 13 shows an example of a routine for preventing the simultaneous execution of the engine starting operation and the shifting operation of the gear stage. According to the routine shown in FIG. 13, if the shifting operation of the gear stage is demanded during starting the engine 5, the shifting operation of the gear stage is delayed. However, the routine shown in FIG. 13 may be modified to delay the engine starting operation if the engine 5 is required to be started during the shifting operation of the gear stage. In this case, execution of the shifting operation of the gear shift may be determined instead of execution of the starting operation of the engine 5, and a demand to start the engine 5 is determined instead of a demand to shift the gear stage.

At step S1, it is determined whether the engine starting operation is in execution. Such determination may be made based on a flag representing an execution of the engine starting operation. Instead, such determination may also be made based on a fact that the target speed of the first motor 6 is set based on the engine starting speed.

If the engine starting operation is currently in execution so that the answer of step S1 is YES, the routine progresses to step S2 to determine whether the shifting operation of the gear stage is demanded. Specifically, it is determined whether the gear stage is required to be shifted from the fixed stage to the speed reducing stage, or from the speed reducing stage to the fixed stage with reference to FIGS. 11 and 12. Instead, when a temperature of the rear motor 30 is raised to a predetermined level, it is also possible to determine whether an operation efficiency of the rear motor 30 can be increased by executing the shifting operation of the gear stage. In this case, the answer of step S2 will be YES if the operation efficiency of the rear motor 30 can be increased.

If the shifting operation is required so that the answer of step S2 is YES, the routine progresses to step S3 to turn on a flag Fre to delay the shifting operation, and thereafter the routine returns. Consequently, the engine starting operation is continued and the shifting operation is delayed. In this case, the shifting operation will be started upon completion of the engine starting operation to be determined at after-mentioned step S5. By contrast, the shifting operation is not required so that the answer of step S2 is NO, the routine returns. In this case, the engine starting operation is continued and the flag Fre is kept to be tuned off.

Otherwise, if the engine starting operation is currently not in execution so that the answer of step S1 is NO, the routine progresses to step S4 to determine whether the flag Fre is turned on. Specifically, it is determined whether the shifting control is delayed, in other words, it is determined whether the condition to execute the shifting operation has been satisfied but the shifting operation has not yet been started. If the flag Fre is on so that the answer of step S4 is YES, the routine progresses to step S5 to turn off the flag Fre, and thereafter the routine returns. Consequently, the shifting operation is started. By contrast, if the flag Fre is off so that the answer of step S4 is NO, the routine returns.

Thus, if the shifting operation of the gear stage is required during execution of the engine starting operation, the shifting operation of the gear stage is delayed until the completion of the engine starting operation. For this reason, the drive force will not be changed significantly by the simultaneous execution of the engine starting operation and the shifting operation of the gear stage.

The engine 5 is required to be started and the gear stage is required to be shifted based on a factor other than the operating point governed by the required drive force and the vehicle speed. For example, when temperatures of the gears 11, 12, 13, 17, 18, and 19 of the transmission 31 are raised excessively as a result of transmitting a large torque through the transmission 31, the gear stage of the transmission 31 would be required to be shifted to the fixed stage. Likewise, when temperatures of the first power control system 44 and the second power control system 45 are raised excessively, the engine 5 would be required to be started to shift the operating mode to the HV mode. Thus, the engine 5 may be required to be started and the gear stage may be required to be shifted to protect components of the vehicle. In those situations, it is not preferable to delay the engine starting operation or the shifting operation.

In addition, when the accelerator pedal is depressed by the driver to accelerate the vehicle, it is preferable to generate a drive force in line with the driver's intension even if a shock is generated. In this case, it is also not preferable to delay the engine starting operation and the shifting operation of the gear stage.

According to the embodiment, therefore, the drive force control system is further configured not to delay the engine starting operation and the shifting operation of the gear stage for the purpose of protecting the components of the vehicle and accelerating the vehicle in line with the driver's intension. An example of such control is shown is shown in FIG. 14, and detailed explanation for the steps in common with those in the routine shown in FIG. 13 will be omitted.

Figure 14:
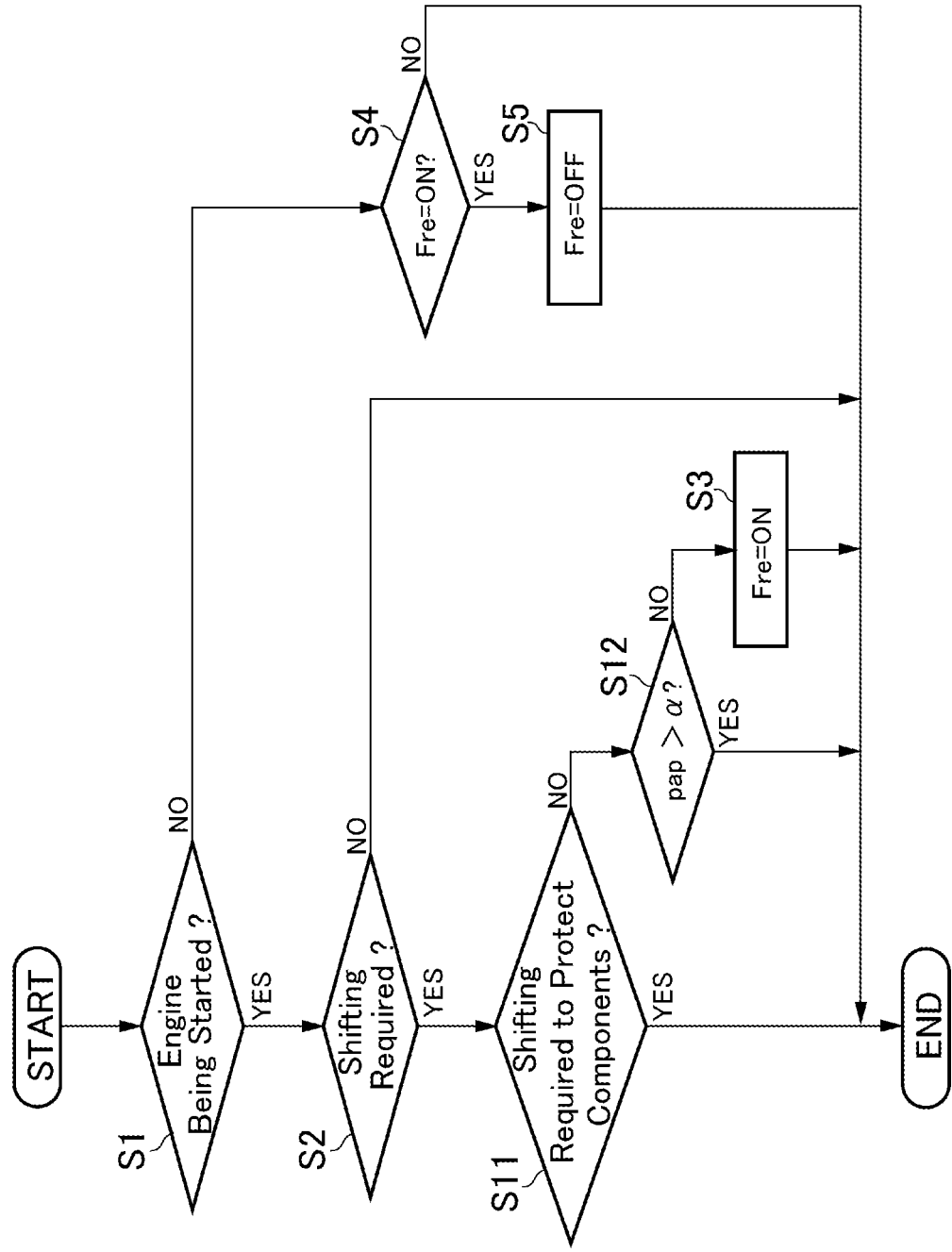
FIG. 14 is a flowchart showing one example of a routine not to delay a shifting operation when protecting parts or when an abrupt acceleration is demanded.

According to the routine shown in FIG. 14, if the shifting operation is required so that the answer of step S2 is YES, the routine progresses to step S11 to determine whether the shifting operation is required for the purpose of protecting the components of the vehicle. Specifically, the answer of step S11 will be YES in a case that the shifting operation is required despite the fact that the operating point does not shift across the "Fixed Stage→Speed Reducing Stage" line or the "Speed Reducing Stage→Fixed Stage" line shown in FIGS. 11 and 12.

If the shifting operation is required for the purpose of protecting the components so that the answer of step S11 is YES, the routine returns. In this case, the shifting operation will be executed. By contrast, if the shifting operation is required but not for the purpose of protecting the components so that the answer of step S11 is NO, the routine progress to step S12 to determine whether a depression pap of the accelerator pedal is greater than a threshold value a. For example, the threshold value a may be set to a value at which a kick-downshifting is caused, or to an upper limit value of a depression of a case in which the vehicle travels in an urban area or suburban area. Optionally, the threshold value a may be updated based on an accelerating operation of the driver.

If the depression pap of the accelerator pedal is greater than the threshold value a so that the answer of step S12 is YES, the routine returns. In this case, the shifting operation will also be executed. By contrast, if the depression pap of the accelerator pedal is smaller than the threshold value a so that the answer of step S12 is NO, the routine progresses to step S3 to turn on the flag Fre to delay the shifting operation, and thereafter the routine returns.

Thus, in the case that the shifting operation is required to protect the components, the shifting operation will be executed without delay to limit damages on the components. In addition, in the case that the shifting operation is required to accelerate the vehicle, the shifting operation will also be executed without delay to accelerate the vehicle in line with the driver's intension.

Figure 15:
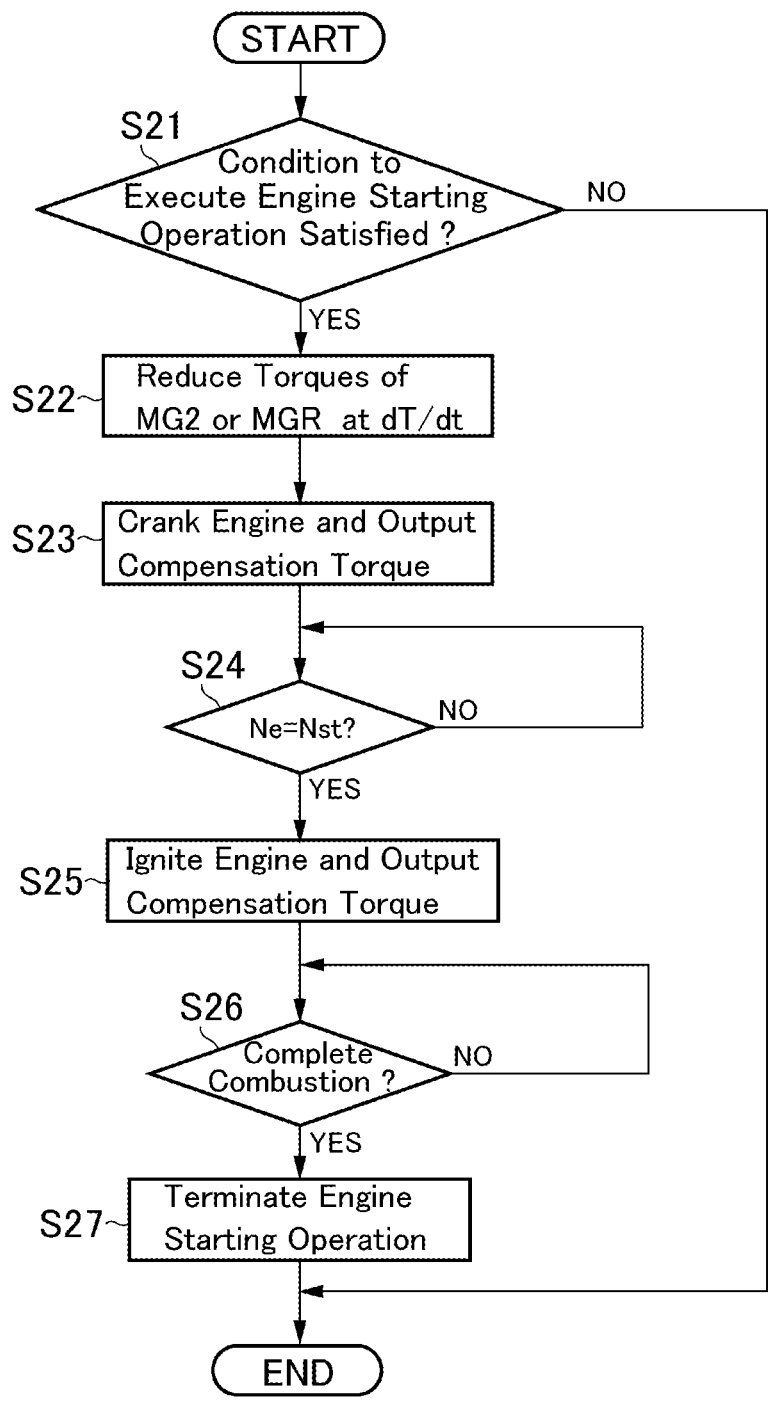
FIG. 15 is a flowchart showing one example of a routine to reduce a change in the drive force when starting the engine.

As described, the drive force control system according to the embodiment is configured to prevent the simultaneous execution of the engine starting operation and the shifting operation of the gear stage. Therefore, in the case that the engine starting operation and the shifting operation are executed separately, a total required time to complete those operations will be longer than that of a case in which those operations are executed simultaneously. If the drive force is changed for a long period of time, the driver may feel uncomfortable feeling. Therefore, the drive force control system according to the embodiment is configured to reduce a change in the drive force during execution of the engine starting operation and the shifting operation of the gear stage. An example of a routine to reduce a change in the drive force during execution of the engine starting operation is shown in FIG. 15.

At step S21, it is determined whether the condition to execute the engine starting operation is satisfied. Specifically, the answer of step S21 will be YES, in a case that a condition to shift the operating mode from the EV mode to the HV mode is satisfied in the map, and that the flag Fre(eng) to delay the engine starting operation is off.

If the condition to execute the engine starting operation is not satisfied so that the answer of step S21 is NO, the routine returns. By contrast, if the condition to execute the engine starting operation is satisfied so that the answer of step S21 is YES, the routine progresses to step S22 to reduce output torques of the second motor 7 and the rear motor 30 at a predetermined reduction rate dT/dt. That is, before starting the engine 5, the vehicle is propelled by the torques of the second motor 7 and the rear motor 30 in accordance with a required drive force. In this case, therefore, the required torques of the second motor 7 and the rear motor 30 are reduced at a rate at which the driver may not feel uncomfortable feeling. To this end, the reduction rate dT/dt is set based on a result of simulation or experiment.

Then, at step S23, the engine starting operation is started. At step S23, specifically, the engine 5 is cranked by the first motor 6, and the second motor 7 and the rear motor 30 generate a compensation torque for reducing a change in the drive force caused as a result of the cranking of the engine 5. To this end, at step S23, a reduction amount in the drive force as might be caused by the cranking of the engine 5 is calculated, and a torque required to compensate the calculated reduction in the drive force is added to the required torques of the second motor 7 and the rear motor 30.

Thereafter, it is determined at step S24 whether an engine speed Ne reaches a starting speed Nst. If the engine speed Ne has not yet reached the starting speed Nst so that the answer of step S24 is NO, the routine returns to step S23. By contrast, if the engine speed Ne has reached the starting speed Nst so that the answer of step S24 is YES, the routine progresses to step S25 to ignite the engine 5, and to output the compensation torque by the second motor 7 and the rear motor 30. After the ignition of the engine 5, the engine torque is increased and decreased repeatedly. At step S25, therefore, an increasing amount and a decreasing amount of the engine torque are calculated respectively, and the calculated increasing amount is subtracted from the required torques of the second motor 7 and the rear motor 30, or the calculated decreasing amount is added to the required torques of the second motor 7 and the rear motor 30. Thus, the required torques of the second motor 7 and the rear motor 30 are corrected to reduce a change in a total torque of the output torques of the engine 5, the second motor 7, and the rear motor 30.

Thereafter, it is determined at step S26 whether complete combustion of the engine 5 has been attained. If the complete combustion of the engine 5 has not yet been attained so that the answer of step S26 is NO, the routine returns to step S25. By contrast, if the complete combustion of the engine 5 has been attained so that the answer of step S26 is YES, the routine progresses to step S27 to terminate the engine starting operation. At step S26, specifically, an execution flag Fst of the engine starting operation is turned off. Thereafter, the routine returns.

By thus reducing the output torques of the second motor 7 and the rear motor 30 before executing the engine starting operation, an available capacity to an upper limit torque of each of the second motor 7 and the rear motor 30 can be increased. For this reason, the second motor 7 and the rear motor 30 are allowed to generate the compensation torque sufficiently. In addition, by thus reducing the output torques of the second motor 7 and the rear motor 30 at the reduction rate dT/dt, shocks resulting from the change in the output torques can be reduced. Further, by thus compensating the change in the drive force resulting from the cranking of the engine 5 by the compensation torque, discomfort while the reduction in the drive force can be reduced.

Figure 16:
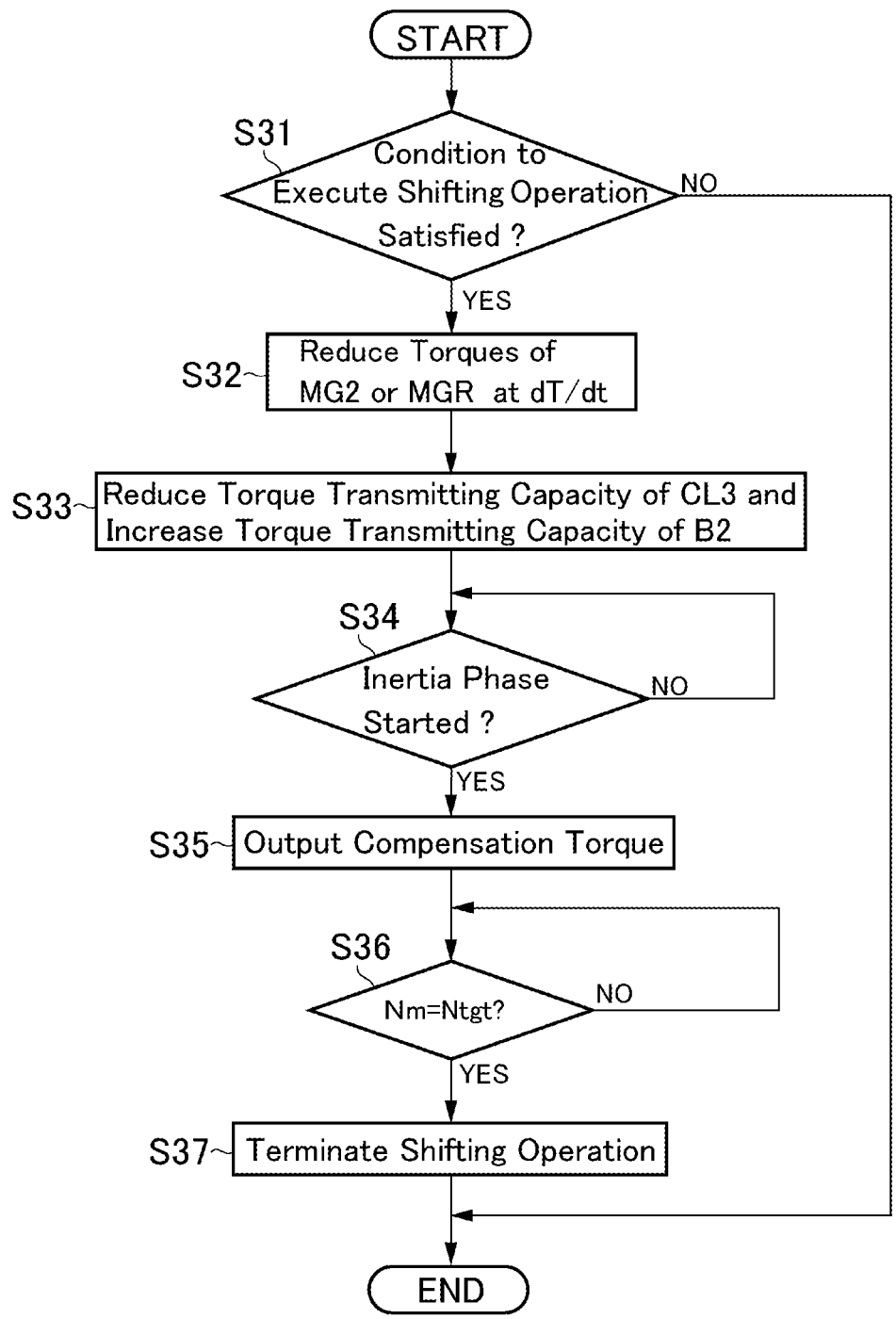
FIG. 16 is a flowchart showing one example of a routine to reduce a change in the drive force during a shifting operation.

An example of a routine to reduce a change in the drive force during execution of the shifting operation of the gear stage is shown in FIG. 16. At step S31, it is determined whether the condition to execute the shifting operation of the gear stage is determined. Specifically, the answer of step S31 will be YES, in a case that a condition to shift the gear stage between the fixed stage and the speed reducing stage is satisfied in the map, and that the flag Fre(ch) to delay the shifting operation is off.

If the condition to execute the shifting operation is not satisfied so that the answer of step S31 is NO, the routine returns. By contrast, if the condition to execute the shifting operation is satisfied so that the answer of step S31 is YES, the routine progresses to step S32 to reduce output torques of the second motor 7 and the rear motor 30 at the reduction rate dT/dt. That is, before shifting the gear stage, the vehicle is propelled by the torques of the second motor 7 and the rear motor 30 in accordance with a required drive force. In this case, therefore, the required torques of the second motor 7 and the rear motor 30 are reduced at the reduction rate dT/dt at which the driver may not feel uncomfortable feeling.

Then, at step S33, the shifting operation is started. At step S33, specifically, a reduction of a torque transmitting capacity of the engagement device currently in engagement (e.g., the third clutch CL3) is started, and an increase of a torque transmitting capacity of the engagement device currently in disengagement (e.g., the second brake B2) is started. Thus, at step S33, the gear stage is shifted by the aforementioned "clutch-to-clutch shifting" in which the torque transmitting capacity of the third clutch CL3 is reduced gradually and the torque transmitting capacity of the second brake B2 is increased gradually. To this end, a shifting time is set in such a manner that an inertia torque of the second motor 7 during shifting operation will not be increased to a level at which the driver feels discomfort.

Then, at step S34, commencement of the inertia phase is determined based e.g., on a change in a speed of the rear motor 30.

If the inertia phase has not yet started so that the answer of step S34 is NO, the routine returns to step S33. By contrast, if the inertia phase has started so that the answer of step S34 is YES, the routine progresses to step S35 to compensate a reduction in the drive force resulting from the commencement of the inertia phase by generating the compensation torque by the second motor 7. At step S35, specifically, a reduction amount in the drive force resulting from the commencement of the inertia phase is calculated, and a torque required to compensate the reduction in the drive force is added to a required torque of the second motor 7.

Thereafter, it is determined at step S36 whether a speed Nm of the second motor 7 reaches a target speed Ntgt calculated based on a vehicle speed and a speed ratio of the transmission 31 to be achieved after the shifting operation. If the speed Nm of the second motor 7 has not yet reached the target speed Ntgt so that the answer of step S36 is NO, the routine returns to step S35. By contrast, if the speed Nm of the second motor 7 has reached the target speed Ntgt so that the answer of step S36 is YES, the routine progresses to step S37 to terminate the shifting operation. At step S37, specifically, an execution flag Fch of the shifting operation is turned off. Thereafter, the routine returns.

By thus reducing the output torques of the second motor 7 and the rear motor 30 before executing the shifting operation, change in the drive force resulting from execution of the shifting operation can be reduced. By thus reducing the output torque of the second motor 7 before executing the shifting operation, an available capacity of the second motor 7 to the upper limit torque can be increased. For this reason, the second motor 7 is allowed to generate the compensation torque sufficiently during execution of the shifting operation. In addition, by thus reducing the output torque of the second motor 7 or the rear motor 30 at the reduction rate dT/dt, shocks resulting from the change in the output torques can be reduced. Further, by thus compensating the change in the drive force resulting from the shifting operation by the compensation torque, discomfort while the reduction in the drive force can be reduced. Furthermore, an angular velocity of the second motor 7 can be reduced by extending the shifting time. For this reason, the inertia torque during execution of the shifting operation can be reduced thereby reducing a change in the drive force.

Figure 17:
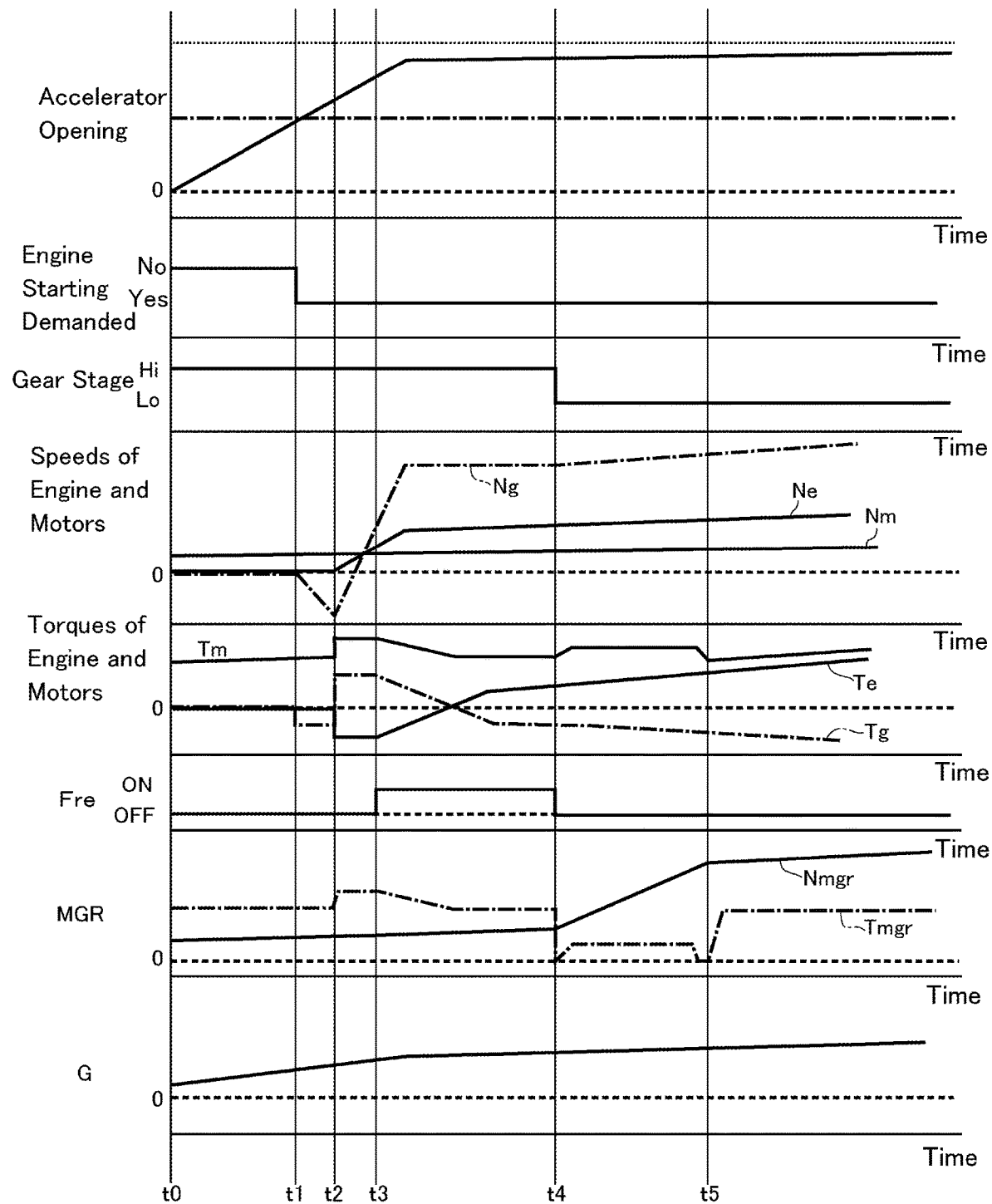
FIG. 17 is a time chart showing temporal changes in an opening degree of an accelerator, a transmission of an engine starting demand, a required gear stage of the transmission, speeds of the engine and the motors, torques of the engine and the motors, a status of a flag representing delay of the shifting control, a speed and a torque of a rear motor, and an acceleration of the vehicle, in a case that a shifting operation is required during startup of the engine.

FIG. 17 is a time chart showing a situation of a case in which the conditions to execute the engine starting operation and the shifting operation are satisfied to accelerate the vehicle, and hence the operating mode is shifted from the first EV mode to the HV-Hi mode and the gear stage of the transmission 31 is shifted from the fixed stage to the speed reducing stage. Specifically, FIG. 17 shows temporal changes in a depression of the accelerator pedal, a starting demand of the engine 5, a required gear stage of the transmission 31, a speed (Ne) of the engine 5, a speed (Ng) of the first motor 6, a speed (Nm) of the second motor 7, an output torque (Te) of the engine 5, an output torque (Tg) of the first motor 6, an output torque (Tm) of the second motor 7, the flag Fre to delay the shifting operation, a speed (Nmgr) of the rear motor 30, an output torque (Tmgr) of the rear motor 30, and an acceleration (G) of the vehicle.

At point t0, a required drive force is small and the vehicle is propelled in the first EV mode. In this situation, startup of the engine 5 has not yet been demanded. Therefore, the engine 5 and the first motor 6 are stopped without generating torques, and the fixed stage is established in the transmission 31.

When the accelerator pedal is depressed to a first depression pap1 at point t1, an operating point governed by a required drive force and a vehicle speed is shifted to the region where the HV-Hi mode is selected. At point t1, however, the operating point has not yet been shifted to the region where the speed reducing stage is established in the transmission 31. Consequently, the engine 5 is required to be started at point t1, and a speed and a torque of the first motor 6 start changing. Specifically, in order to engage the second clutch CL2, the speed of the first motor 6 is controlled in such a manner that a speed of the carrier 20 is synchronized with a speed of the ring gear 18. Then, when the speed of the carrier 20 is synchronized with the speed of the ring gear 18 at point t3, the second clutch CL2 is engaged and the torque and the speed of the first motor 6 are controlled to crank the engine 5. In this situation, in order to prevent a reduction in the drive force, the output torques of the second motor 7 and the rear motor 30 are increased. Consequently, the speed of the engine 5 starts increasing. Here, since the engine 5 acts as a reaction during cranking, the torque of the engine 5 is indicated as a negative torque in FIG. 17.

When the speed of the engine 5 reaches the starting speed at point t4, the engine 5 is started. Consequently, the reaction of the engine 5 is reduced gradually, and a drive force is generated eventually. In this situation, the speed of the first motor 6 is reduced gradually and the torque of the first motor 6 is reduced gradually in the counter direction to establish a reaction torque. With the reduction in the reaction force of the engine 5, the output torques of the second motor 7 and the rear motor 30 are also reduced. In addition, at point t4, a shifting operation from the fixed stage to the speed reducing stage is required. However, the engine starting operation has not yet been completed in this situation and hence the flag Fre is turned on. Therefore, the shifting operation of the transmission 31 is not executed at point t4.

When the engine starting operation is completed at point t5, the flag Fre is turned off to execute the shifting operation. Consequently, the output torque of the rear motor 30 is reduced temporarily. In this situation, the rear motor 30 generates a torque of certain magnitude to increase the speed of the rear motor 30, and the output torque of the second motor 7 is increased to compensate the reduction in the drive force. When the shifting operation is completed at point t6, the rear motor 30 starts generating a drive torque to achieve a required drive force.

Although the above exemplary embodiments of the present disclosure have been described, it will be understood by those skilled in the art that the present disclosure should not be limited to the described exemplary embodiments, and various changes and modifications can be made within the scope of the present disclosure. For example, in a case that both of the conditions to execute the engine starting operation and the shifting operation prior to the commencement of any one of the operations, a priority order to execute those operations may be determined flexibly according to need.

In the hybrid vehicle to which the control system according to the embodiment is applied, a single pinion planetary gear unit in which a power split ratio to the first motor 6 side and to the output side is constant may also be used as the transmission. The control system according to the embodiment may also be applied to a hybrid vehicle in which a conventional geared transmission is arranged on a torque transmitting path between the transmission and the drive wheels. Further, the control system according to the embodiment may also be applied to a hybrid vehicle in which one of pairs of front wheels and rear wheels are driven by an engine power transmitted through a drive unit, and other one of the pairs of the front wheels and the rear wheels are driven by a motor power transmitted through another drive unit. As to transmission 31, a belt-driven continuously variable transmission and a toroidal continuously variable transmission may also be used instead of the transmission in which the gear stage is shifted by manipulating the clutches. In addition, a starter motor for cranking the engine 5 may be employed in the first drive unit 2 instead of the first motor 6.

In the power split mechanism 8, the rotary elements to be connected by engaging the first clutch CL1 or the second clutch Cl2 may be altered from those shown in FIG. 1, and the rotary elements connecting the power split section 9 and the transmission section 10 (i.e., the carrier 14 and the sun gear 17) may also be altered from those shown in FIG. 1. That is, the drive force control system according to the embodiment may be applied to a hybrid vehicle comprises: a first differential mechanism adapted to perform a differential action among a first rotary element connected to an engine, a second rotary element connected to a first rotary machine, and a third rotary element connected to drive wheels; a second differential mechanism adapted to perform a differential action among a fourth rotary element, a fifth rotary element connected to the third rotary element, and a sixth rotary element; a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element.

What is claimed is:

1. A drive force control system for a hybrid vehicle, comprising:
    an engine that is connected to either a pair of front wheels or a pair of rear wheels in a torque transmittable manner;
    a first rotary machine that is connected to the pair of front wheels or the pair of rear wheels, not connected to the engine, in a torque transmittable manner;
    a transmission that changes a speed ratio between the first rotary machine and the pair of front wheels or the pair of rear wheels, not connected to the engine; and
    a controller that controls the engine and the transmission, wherein
    the controller is configured to restrict execution of a shifting operation of the transmission if the execution of the shifting operation of the transmission is demanded during execution of an engine starting operation; and
    the controller is configured to restrict execution of the engine starting operation if the execution of the engine starting operation is demanded during execution of the shifting operation of the transmission.

2. The drive force control system for a hybrid vehicle as claimed in claim 1, wherein the controller is further configured to delay execution of any one of the engine starting operation and the shifting operation of the transmission when a condition to execute the engine starting operation and a condition to execute the shifting operation of the transmission are satisfied.

3. The drive force control system for a hybrid vehicle as claimed in claim 2, wherein the controller is further configured to delay execution of the shifting operation of the transmission with respect to the engine starting operation.

4. The drive force control system for a hybrid vehicle as claimed in claim 1, wherein an output torque of the first rotary machine is
determined in accordance with a required drive force of
the vehicle, and wherein the controller is further configured to calculate a change in a torque delivered to the pair of front
wheel or the pair of rear wheel during execution of the
engine starting operation, increase the output torque of the first rotary machine in a
case that the torque delivered to the pair of front wheels
or the pair of rear wheel during execution of the engine
starting operation is reduced, and reduce the output torque of the first rotary machine in a
case that the torque delivered to the pair of front wheels
or the pair of rear wheel during execution of the engine
starting operation is increased.

5. The drive force control system for a hybrid vehicle as claimed in claim 4, wherein the controller is further configured to start the engine starting operation after reducing the output torque of the first rotary machine when the condition to execute the engine starting operation is satisfied.

6. The drive force control system for a hybrid vehicle as claimed in claim 1, wherein the controller is further configured to start the shifting operation of the transmission after reducing the output torque of the first rotary machine when the condition to execute the shifting operation of the transmission is satisfied.

7. The drive force control system for a hybrid vehicle as claimed in claim 1, wherein the controller is further configured to calculate a required drive force of the vehicle, and not to restrict said other one of the engine starting operation and the shifting operation of the transmission in a case that the calculated required drive force is greater than a predetermined value.

8. The drive force control system for a hybrid vehicle as claimed in claim 1, wherein the controller is further configured not to restrict said other one of the engine starting operation and the shifting operation of the transmission in a case that a condition to execute said other one of the engine starting operation and the shifting operation of the transmission is satisfied to protect a component of the vehicle including the engine, the first rotary machine, and the transmission.

9. The drive force control system for a hybrid vehicle as claimed in claim 1, wherein the controller is further configured to set a rate of shifting the speed ratio based on an inertia torque of the first rotary machine resulting from execution of the shifting operation of the transmission.

10. The drive force control system for a hybrid vehicle as claimed in claim 1, further comprising:

a second rotary machine that is connected to the pair of front wheels or the pair of rear wheel, wherein an output torque of the second rotary machine is determined in accordance with a required drive force of the vehicle, and wherein the controller is further configured to calculate a change in a torque delivered to said one of the pairs of to the pair of front wheels or the pair of rear wheel during execution of the engine starting operation, increase the output torque of the second rotary machine in a case that the torque delivered to the pair of front wheels or the pair of rear wheel during execution of the engine starting operation is reduced, and reduce the output torque of the second rotary machine in a case that the torque delivered to the pair of front wheels or the pair of rear wheels during execution of the engine starting operation is increased.

11. The drive force control system for a hybrid vehicle as claimed in claim 10, wherein the controller is further configured to start the engine starting operation after reducing the output torque of the second rotary machine when the condition to execute the engine starting operation is satisfied.

12. The drive force control system for a hybrid vehicle as claimed in claim 1, further comprising:

a control rotary machine that translates an output power of the engine partially into an electric power, and a power split mechanism that distributes the output power of the engine to the control rotary machine and to an output member, wherein the power split mechanism is adapted to establish a first mode in which the output power of the engine is distributed to the control rotary machine and to an output member at a first predetermined ratio, and a second mode in which the output power of the engine is distributed to the control rotary machine and to an output member at a second predetermine ratio where a ratio of the power distributed to the output member is smaller than that of the first predetermine ratio, and wherein the controller is further configured to crank the engine by an output torque of the third rotary machine.

\* \* \* \* \*

UNITED STATES PATENT AND TRADEMARK OFFICE
CERTIFICATE OF CORRECTION

PATENT NO. : 10,737,682 B2  
APPLICATION NO. : 16/116343  
DATED : August 11, 2020  
INVENTOR(S) : Tatsuya Imamura et al.

Page 1 of 1

It is certified that error appears in the above-identified patent and that said Letters Patent is hereby corrected as shown below:

In the Claims

- In Column 23, Line 6, Claim 4, please delete "wheel or the pair of rear wheel during execution of the" insert --wheels or the pair of rear wheels during execution of the--.

- In Column 23, Line 10, Claim 4, please delete "wheel" insert --wheels--.

- In Column 23, Line 14, Claim 4, please delete "wheel" insert --wheels--.

- In Column 24, Line 6, Claim 10, please delete "wheel" insert --wheels--.

- In Column 24, Line 13, Claim 10, please delete "wheel" insert --wheels--.

- In Column 24, Line 17, Claim 10, please delete "wheel" insert --wheels--.

- In Column 24, Line 32, Claim 12, please delete "power," insert --power;--.

Signed and Sealed this  
First Day of December, 2020

Andrei Iancu  
*Director of the United States Patent and Trademark Office*